US006922494B1

(12) United States Patent
Fay

(10) Patent No.: US 6,922,494 B1
(45) Date of Patent: Jul. 26, 2005

(54) AUTOMATED IMAGE SCALING

(75) Inventor: Pierre N. Fay, Westport, CT (US)

(73) Assignee: Eye Web, Inc., New York, NY (US)

( * ) Notice: Subject to any disclaimer, the term of this patent is extended or adjusted under 35 U.S.C. 154(b) by 0 days.

(21) Appl. No.: 09/404,745

(22) Filed: Sep. 24, 1999

(51) Int. Cl.[7] .................................................. G06K 9/32
(52) U.S. Cl. ........................ 382/298; 382/106; 348/163
(58) Field of Search ................................ 382/298, 106, 382/100, 294; 348/163, 162; 250/336.1; 367/87

(56) References Cited

U.S. PATENT DOCUMENTS

| | | | |
|---|---|---|---|
| 4,031,544 A | 6/1977 | Lapetina ........................ | 358/99 |
| 4,845,641 A | 7/1989 | Ninomiya et al. ........... | 364/518 |
| 5,280,570 A | 1/1994 | Jordan .......................... | 395/135 |
| 5,428,448 A * | 6/1995 | Albert-Garcia ............. | 356/376 |
| 5,446,515 A | 8/1995 | Wolfe et al. ................. | 354/290 |
| 5,455,806 A * | 10/1995 | Hutson ........................ | 367/100 |
| 5,592,248 A | 1/1997 | Norton et al. .............. | 351/246 |
| 5,983,201 A | 11/1999 | Fay .............................. | 705/27 |
| 6,011,754 A * | 1/2000 | Burgess et al. ............. | 367/116 |
| 6,240,050 B1 * | 5/2001 | Pinto ........................... | 367/116 |

* cited by examiner

Primary Examiner—Yon J. Couso
(74) Attorney, Agent, or Firm—Ware, Fressola, Van Der Sluys & Adolphson LLP

(57) ABSTRACT

The present invention provides a method and apparatus for capturing an image of a persons head, or other object, positioned in front of a camera and accurately scaling the head based on the distance of the head from the camera. A sonar system is used determine the distance of the object to the camera. The sonar system can include a first sonar device which is operated to measure the distance of the object to a predetermined point and a second sonar device which is used to measure the distance of the camera to the predetermined point. A calculation of the distance from the object to the camera is based upon the sonar measurements. The image created by the camera can be scaled according to the distance of the object to the camera as determined with the sonar. An image created by the camera can be displayed on a screen of a computer associated with the imaging system. Software on the computer can transpose an image of an eyeglass frame over the image of a face, wherein the image of the face was captured by the camera. Measurements relating to proper sizing of an eyeglass or other corrective lens can be performed on the computer screen. Other observations and image manipulations can also be made including skin tone, facial features, head shape and size, application of cosmetics, proposed surgery, and many other uses.

16 Claims, 5 Drawing Sheets

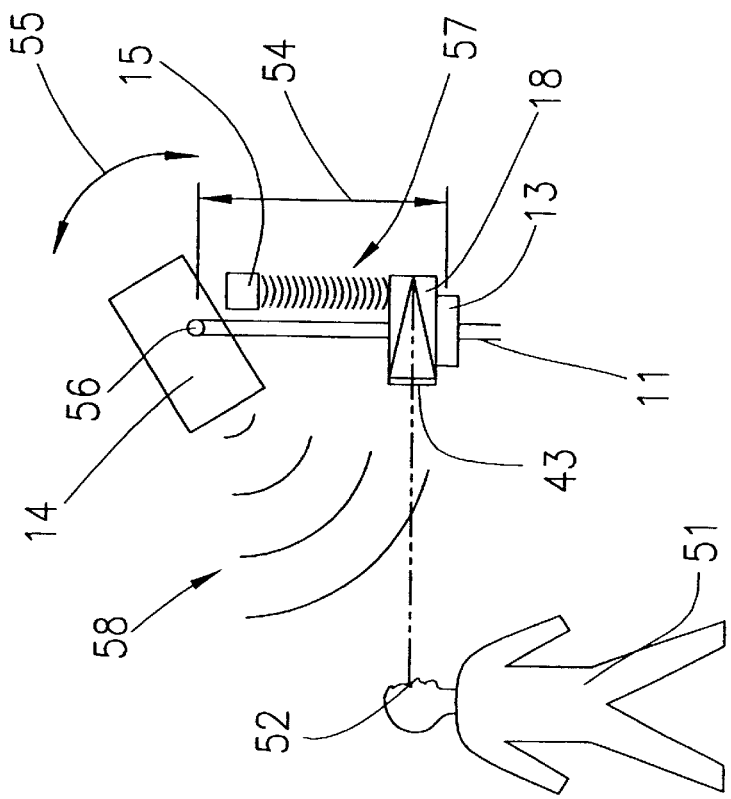
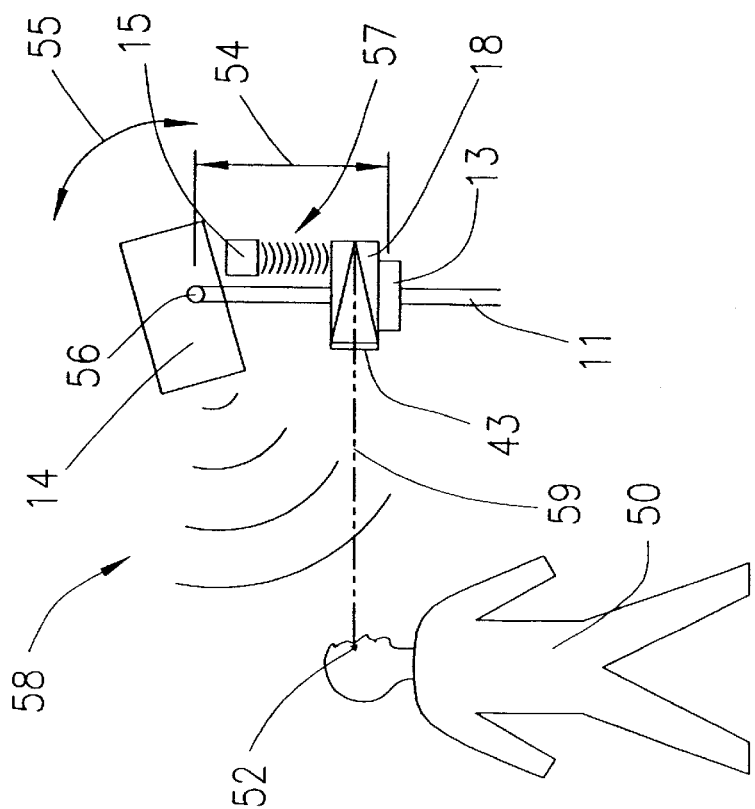

AUTOMATED IMAGE SCALING

BACKGROUND

The invention relates system and method for creating a scaled image, such as for example an image of a face and head. In particular, the invention relates to a system that uses sonar for determining a precise distance of an object from a lens of a camera utilized to render an electronic image.

The use of digital imaging is well known. Digital images are used in a variety of embodiments for portraying an image on the screen of a computer. Devices such as digital cameras and video capture boards are commonly used for entering an image into an electronic storage medium accessible by a computer.

It is also known to scale an image to better gauge the actual size of an object located within an electronic image. Various techniques have been used to attempt to size an object within an image. One technique uses a mounting device to position a known scale within the image. The image can be sized until the scale within the image correlates with a grid or other measurement in the image. The theory is that once the scale within the image is sized, other objects within image can also be measured with the grid. In practice however, it is often difficult to position the scale exactly perpendicular to the camera lens. Any inconsistency in angle or positioning can result in an inaccurate calculation. In addition it is an added burden requiring specialized knowledge to properly place the scale in the image.

Other known techniques include positioning an object which is the subject of an image in a particular predetermined position at a known distance from a mounted camera. The known distance allows a calculation to be made to size the object. Positioning in this technique is critical. Specialized skill is required to arrange the respective positions of the camera and the object which is the subject of the image.

SUMMARY OF THE INVENTION

Accordingly, the present invention provides a method and apparatus for capturing an image of a person's head, or other object, positioned in front of a camera and accurately scaling the head based on the distance of the head from the camera.

A sonar system is used to determine the distance of the object to the camera. In one embodiment, a first sonar device is operated to measure the distance of the object to a predetermined point. A second sonar device is used to measure the distance of the camera to the predetermined point. A calculation of the distance from the object to the camera is then based upon the sonar measurements. The point can be located vertically above the camera.

The image created by the camera can be scaled according to the distance of the object to the camera as calculated. In one aspect of the invention, an angle formed between the object, the predetermined point and the camera can also be calculated. In another aspect, the angle between the predetermined point, the object and the camera can be changed responsive to the vertical position of the camera. The angle of the sonar device in relation to the object can be changed responsive to the vertical positioning of the camera.

In still another aspect, an image created by the camera can be displayed on a screen of a computer associated with the imaging system. In one embodiment, software on the computer can transpose an image of an eyeglass frame over the image of a face, wherein the image of the face was captured by the camera. Measurements relating to proper sizing of an eyeglass or other corrective lens can be performed on the computer screen.

Prior to creating the image, the camera can be vertically positioned until it is horizontally aligned with a desired feature on the object. In one embodiment, the vertical position of the camera and the angle of the sonar device are synchronized to a predetermined distance from the camera.

A system for automated image scaling can include a camera mounted to a vertically movable frame, a sonar system mounted in close proximity to the camera; and an alignment device. In one aspect, the sonar system can include a first sonar device secured with a flexible mount and directed generally to a position in front of the camera with a connecting linkage for changing the angle of tilt of the first sonar device according to the vertical position of the camera. The sonar system can also include a second sonar device fixedly mounted in a position conducive to determining the vertical position of the camera.

In another aspect, the alignment device can include one or more optical indicators aligned horizontally in relation to the camera. A funnel lens positioned in front of an illuminated crosshair can also be included.

A computer associated with the automated image scaling system can store software code operative with the computer to display an image created by the camera; and scale an object contained within the image. The computer can include a storage means for storing a database of images and related information.

The details of one or more embodiments of the invention are set forth in the accompanying drawings and the description below. Implementations may provide advantages such as facilitating more accurate images of a head, wherein the image is suitable for fitting with eye glasses. Other features, objects and advantages of the invention will be apparent from the description and drawings, and from the claims.

BRIEF DESCRIPTION OF THE DRAWINGS

FIG. 5 illustrates one embodiment of an Automated Image Scaling System with a subject person in place.

DETAILED DESCRIPTION OF THE INVENTION

A system and method of capturing an image of a human head whereby a scaled representation of the head can be used for fitting eyewear and corrective lenses. The system can also be used for capturing scaled images of other desired object.

Figure 1:
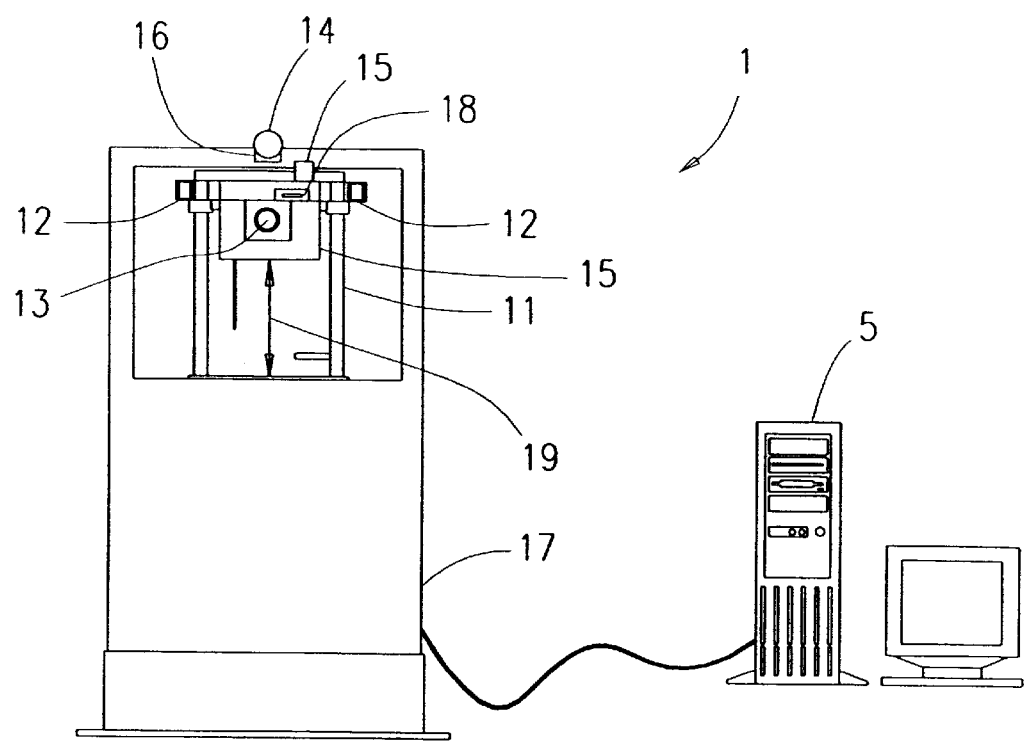
FIG. 1 illustrates an Automated Image Scaling System.

Referring now to FIG. 1, a camera 13 is fixedly mounted on a movable frame 15. The moveable frame 15 is capable of vertically traversing a track 11 through the distance 19. The track can be supported by a chassis 17. As the moveable frame 15 traverses the track 11 the camera 13 can be vertically aligned with the head of a person or other object positioned in front of the camera.

A first sonar device 14 can be secured with a flexible mount 16 or other hinged device to a stable member such as the chassis 17. A tilt angle of the first sonar device 14 should be adjustable as it relates t6 the chassis 17 in order for the sonar to be directed at a person positioned in front of the camera 13. Changing the angle of tilt is one way of properly directing the sonar from the first sonar device 14. The sonar from the first sonar device 14 is directed such that it can accurately calculate the distance from a predetermined point to an object placed in front of the camera 13.

A second sonar device 15 can be fixedly mounted to the chassis 17. The second sonar device 15 is positioned such that it can accurately calculate the vertical distance from a predetermined point to the camera 13.

One or more camera flashes 12 can be located in the proximity of the camera 13 such that operation of the flashes 12 provides light to facilitate capture of a satisfactory image of an object placed in front of the camera 13. In one embodiment, there are two flashes 12, one flash mounted on either side of the camera 13. Additionally, the flashes 12 can follow the vertical movement of the camera 13 to facilitate better lighting of an object placed in front of the camera 13. The vertical movement can be accomplished by attaching the flashes 12 to the moveable frame 15.

Alignment of a feature, such as the eyes on a face, positioned in front of the camera can be accomplished with both a course alignment mechanism and a fine alignment mechanism. To facilitate course alignment, one or more light emitting diodes (LEDs) 16 can be fixedly mounted to the moveable frame 15 adjacent to the camera 13. To accomplish alignment, the moveable frame 15 can be moved up and down the track 11. Both the camera 13 and the LED 16 move with the moveable frame 15. Vertical movement of the frame 15 can be used to bring the feature desired to be photographed in the line of sight of the LED 16. As the camera 13 is fixedly mounted in close proximity to the LED 16, alignment of the desired feature with the LED also positions the desired feature in front of the camera 13.

Fine alignment can be accomplished, for example, with a crosshair through a funnel lens 18. The funnel lens 18 and crosshair will also move vertically, responsive to movement of the moveable frame 15. Further details relating to a fine alignment device follow below.

Figure 2:
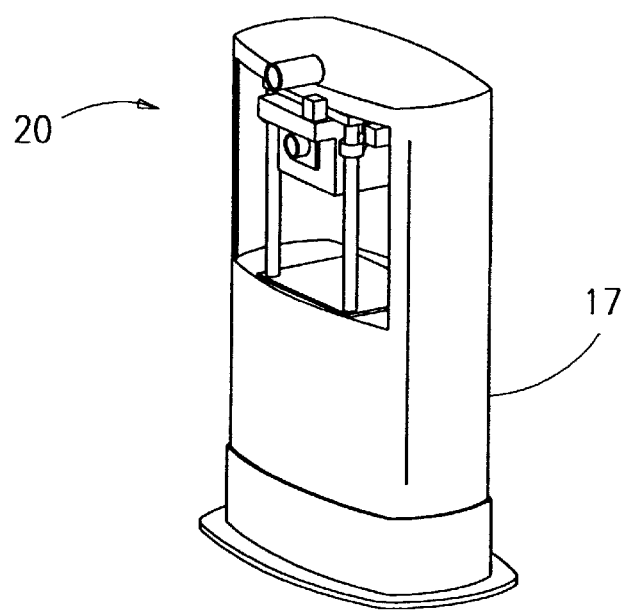
FIG. 2 illustrates a profile of an Automated Image Scaling System contained in a stand alone unit.

Referring now to FIG. 2, the chassis 17, and other system components 11-19, can be housed in a stand alone body 20. The stand alone body 20 can be conveniently located in a facility in a location independent of outside support. Other embodiments include mounting the chassis 17 and other system components 11-19 in a wall or other rigid structure.

Figure 3:
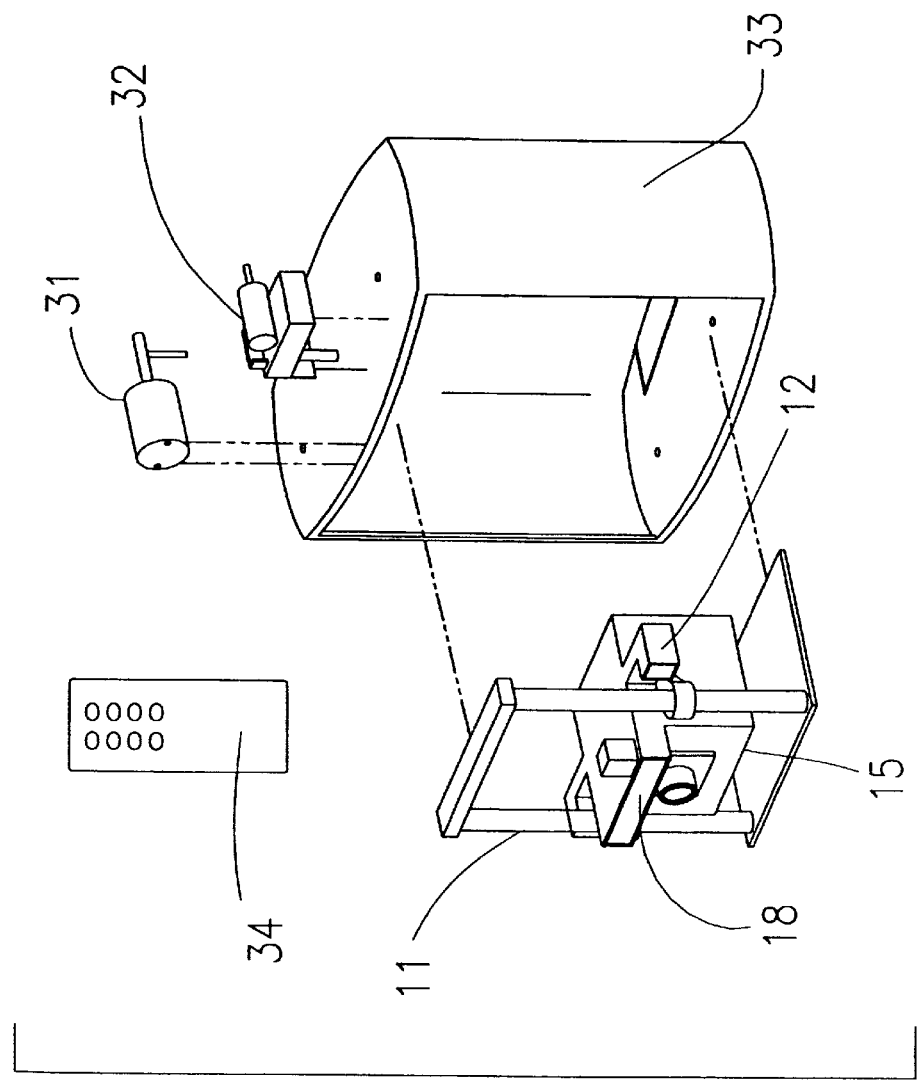
FIG. 3 illustrates vertical positioning device and a remote control in relation to the Automated Image Scaling System and a protective cover.

Referring now to FIG. 3, a protective cover 33 can be used in conjunction with a stand alone support 20. A protective cover 33 can enclose system components such as a fine alignment device 18, flashes 12, track 11, the first sonar device 14 and a vertical positioning device 32. Other system components not shown in the figure can also be enclosed in the protective cover 33.

The vertical positioning device 32 can be used to automatically raise or lower the moveable frame 15 along the track 11. In one embodiment the vertical positioning device can include a stepper motor attached to the moveable frame 15 with a cable via a system of pulleys. Actuation of the stepper motor in one direction can raise the moveable frame 15 and actuation of the stepper motor in the opposite direction can lower the moveable frame 15. Other well known positioning mechanisms can also be used. Additionally, a remote control device 34 can be used to operate the vertical positioning device 32. In one embodiment, the remote control device 34 is a wireless handled device such as those commonly used to control electronic equipment. Other embodiments can include a joystick, a keyboard, or other well known user interface devices. The remote control can be operated by a subject whose image will be captured. Buttons on the remote control can be used to position the camera at a suitable vertical position.

Figure 4:
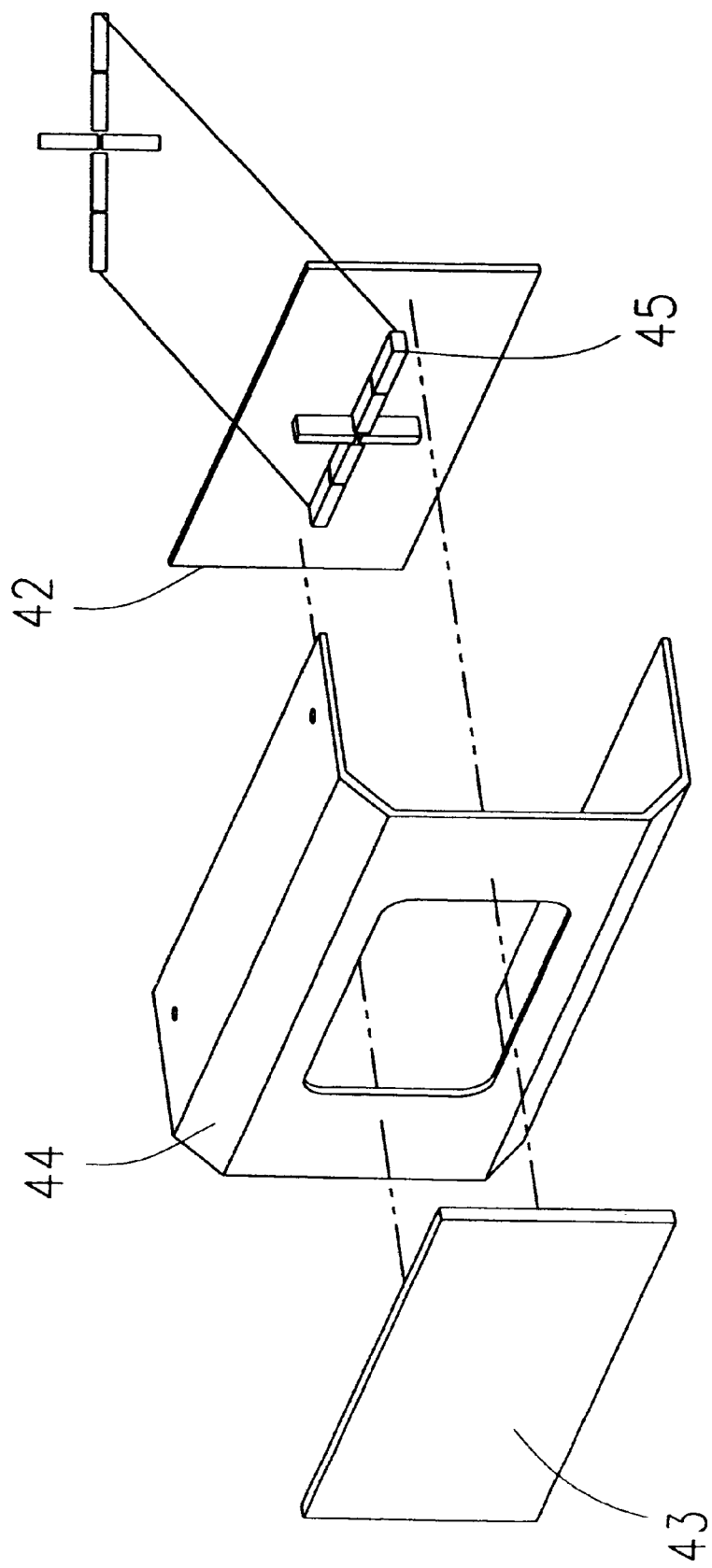
FIG. 4 illustrates a fine alignment device with illuminated crosshairs.

Referring now to FIG. 4, one embodiment of a fine alignment device can include a funnel lens 43 positioned in front of an illuminated cross hair 45. The illuminated cross hair 45 can include, for example, multiple LEDs arranged in a cross configuration. The LEDs can be mounted on a printed circuit board (PCB) 42 and connected to a suitable power source. A crosshair plate 44 can be used to house the lens 18 and the LEDs 45. The funnel lens helps the subject avoid experiencing parallax as they align the crosshairs.

Referring now to FIG. 5, a subject, such a person one 50, can be positioned in front of the camera 13. In the case of a person, this is as simple as walking up and standing in front of the Automated Image Scaling System 1. The camera 13 can be adjusted vertically along the track 11 until the fine alignment device 18 is in line with a feature, such as the eye 52, of person one 50. Vertical adjustment can be accomplished by the subject, person one 50, operating a remote control 34. Buttons on the remote control can cause the camera to go up or down. Proper vertical alignment can be ascertained when the line of sight 59 from the subject's eye 52 can see through the funnel lens 43 to focus on the illuminated cross hair 41. Other objects can be similarly aligned through line of sight.

The position of the camera 13 will correspond with a particular angle of tilt 55 of the first sonar device 14. The first sonar device 14 can, for example, be connected through mechanical linkages to the camera 13 whereby vertical adjustment of the camera 13 automatically adjusts the angle of tilt 55 for the first sonar device 14. Other arrangements, such as electronic positioning of the first sonar device 14 in relation to a camera 13 position can also be used to change the angle of tilt 55.

Generally, the angle of tilt 55 can correlate with the vertical position of the camera 13 such that the first sonar device 14 is directed at an object, such as the head of person one 50, at a predetermined distance. The vertical position of the camera and the angle of the sonar device can be synchronized to a predetermined distance from the camera. A typical predetermined distance would be four feet. Four feet is a comfortable distance for a person to distance themselves from a device such as an Automated Image Scaling System 1. The funnel lens 43 can be focused such that the perceived distance to the cross hair plate 44 is equal to the approximate predetermined distance, i.e., four feet.

The first sonar device 14 can be used to determine the distance of the subject, such as person one 50, from a predetermined point 56. The sonar device 114 uses sonar 58 to determine the distance from the subject, person one 50 to the predetermined point 56.

Sonar device two 15 can be used to determine the distance 54 of the predetermined point 56 to the camera 13. Sonar device two 15 uses sonar 57 to determine that distance 54.

Also illustrated in FIG. 5, is a typical adjustment made for a smaller subject such as person two 51. Repeating the process above, a desired feature, such as an eye 52 is aligned with a fine alignment device 18 through a funnel lens 43. The angle of tilt 55 will change as compared to a larger person one 50. The first sonar device 14 adjusts according to the vertical position of the camera 13. Similarly, the distance 54 measured by the second sonar device 15 will also change. Readings made with the first sonar device and the second sonar device enable an accurate calculation of the distance of the subject such as person to 51 to the camera 13. Using the distance from the predetermined point 56 and the angle of tilt 55 a calculation can be made to determine the distance of the subject such as person one 50 to the camera 13.

A computer 5 associated with the automated image scaling system 1 can calculate an accurate distance of a subject, such as person one 50, from the predetermined point 56 based on the sonar readings. In one embodiment, the computer uses an algorithm that compiles a set of multiple sonar readings. The computer rejects the extreme values located within the set of multiple sonar readings and then averages the remaining values. For example, a set of ten sonar readings can reject the lowest reading and the highest reading and average the remaining eight readings. Another embodiment may include a set of twenty sonar readings. With twenty readings, the lowest two readings and the highest two readings can be rejected whereby the remaining sixteen readings can be averaged.

A computer associated with the automated image scaling device 1 can display multiple images taken with the camera 13 of the subject, such as person one 50. Software residing on the computer, such as well known graphic software, can be used to manipulate an image taken by the camera. For example, the software can be used to zoom in on a desired feature, such as the eye 52. In addition, the software can be used to determine other characteristics of the image including facial skin tone or the size and shape of a head or other object. Analysis of the image can be used for many useful purposes. One purpose includes the fitting of eyeglass frames to the image of a face, including such measurements as the segment height for a multi focal frame or the look of a particular frame on a particular face. Other applications can include the application of cosmetics, proposed cosmetic surgery, security related identification, forensic identification, fitting headwear or any other of a multitude of purposes.

Figure 6:
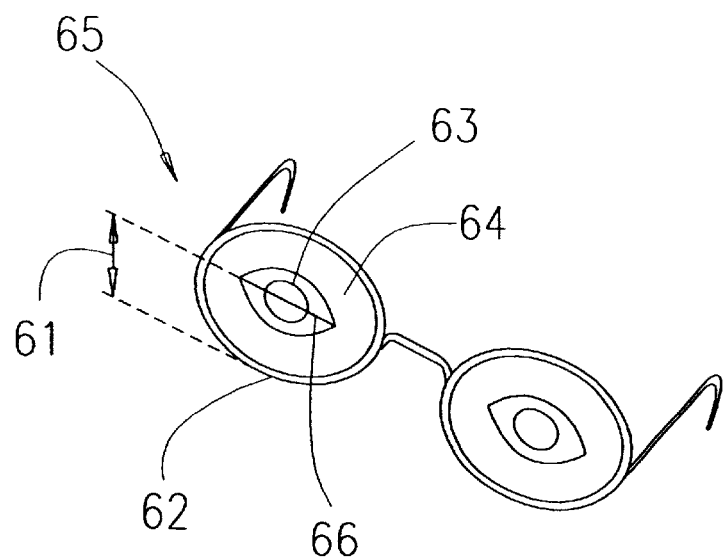
FIG. 6 illustrates a measurement of segment height based on the image of an eye.

Referring now to FIG. 6, in addition to proper fitting of an eyeglass frame to a face, a computerized imaging system can also make important calculations relating to sizing a lens 64 within the eyeglass frame 65, such as proper location for various segments of a multi-focal lens. For example, a segment height 61 can be calculated from the optical center 66 of a pupil to the rim of the frame 62. The accuracy of calculations of a segment height using sonar distancing and digital imaging is greatly improved over a manual method using a ruler placed in front of a subjects eye.

Figure 7:
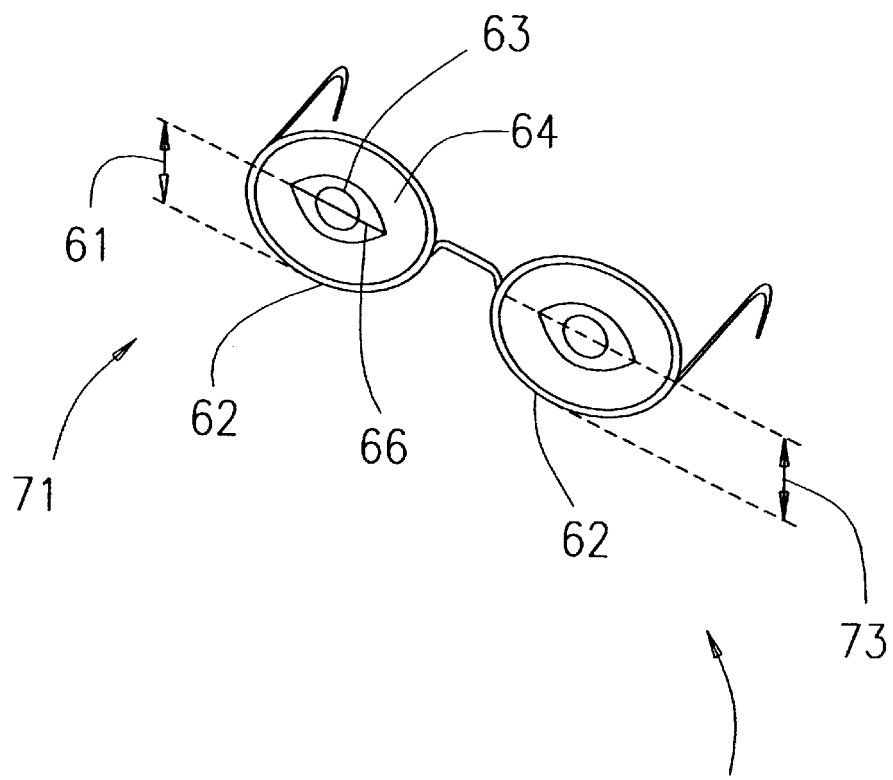
FIG. 7 illustrates an independent segment height measurement.

Referring now to FIG. 7, realizing it is very difficult for a person to hold his face perfectly straight in front of a camera 13, the present invention allows for a separate calculation of segment height for a left eye 71 and a right eye 72. Accordingly, the left segment height 61 can be independently calculated from the right segment height 73. These calculations are based upon the optical center 66 being individually determined for each eye.

A number of embodiments of the present invention have been described. Nevertheless, it will be understood that various modifications may be made without departing from the spirit and scope of the invention. For example three dimensional images can be created by the positioning of multiple cameras at various points around the head or other object of which an image is desired. In a similar fashion, the distance of the object to each camera can be determined. In addition, a system of mirrors can be used to accomplish the 3 dimensional image. Sonar can be used to determine the distance of each mirror from the object. The camera can be at a set distance from each mirror. Therefore, other implementations are within the scope of the following claims.

What is claimed is:

1. A method for capturing an image of an object and for determining the scale of the image relative to the object itself, the method comprising:

positioning the object in front of a camera;

vertically positioning the camera until the camera is horizontally aligned with a desired feature on the object;

changing the angle of a sonar device in relation to the object based on the vertical positioning of the camera;

operating the sonar device to determine the distance of the object to the sonar device;

operating the camera to create the image; and using the distance of the object to the sonar device and the angle of the sonar device in relation to the object to determine the scale of the image relative to the object itself.

2. The method of claim 1 wherein the distance of the object to the camera is determined by a procedure comprising the steps of:

operating a first sonar device to measure the distance of the object to a predetermined point;

operating a second sonar-device to measure the distance of the camera to the predetermined point;

calculating the distance from the object to the camera based upon the sonar measurements and taking into account the angle formed between the object, the predetermined point and the camera.

3. The method of claim 1, wherein the object is a human face, and the method further comprises the steps of:

displaying the image created on a display screen; and transposing an image of an eyeglasses frame over the face.

4. The method of claim 3 additionally comprising the step of performing measurements on the image relating to proper sizing of a lens or an eyeglasses frame.

5. The method of claim 1 wherein the vertical position of the camera and the angle of the sonar device are synchronized to a predetermined distance from the camera.

6. A system for automated image scaling, for capturing an image of an object and for determining the scale of the image relative to the object itself, comprising:

a camera mounted to a vertically movable frame;

a sonar-system mounted in close proximity to the camera; and an alignment device, for vertically aligning the camera with the object;

wherein the sonar system comprises:

a first sonar device secured with a flexible mount and directed generally to a position in front of the camera; and a connecting linkage for changing the angle of tilt of the first sonar device according to the vertical position of the camera as aligned by the alignment device;

and wherein the first sonar device provides a measurement of the distance from the object to the first sonar device, and further wherein the system further includes means for using the distance of the object to the sonar device and the angle of tilt to determine the scale of the image relative to the object itself.

7. The system of claim 6 wherein the sonar system further comprises:
a second sonar device fixedly mounted in a position conducive to determining the vertical position of the camera.

8. The system of claim 6 wherein the alignment device comprises one or more optical indicators aligned horizontally in relation to the camera.

9. The system of claim 6 wherein the alignment device comprises a funnel lens positioned in front of an illuminated crosshairs.

10. The system of claim 6 additionally comprising:
a vertical positioning device for adjusting the vertical position of the camera.

11. The system of claim 6 additionally comprising a computer associated with the automated image scaling system, said computer comprising software code operative with the computer for:
displaying an image created by the camera; and
scaling an object contained within the image.

12. The system of claim 11 wherein the computer comprises a storage means for storing a database of images and related information.

13. A system for capturing an image of an object and for determining the scale of the image relative to the object itself, comprising:
a capturing means mounted to a vertically movable frame, for capturing the image;
a measuring means for determining the scale of the image relative to the object itself; and
an aligning means for vertically aligning the object in front of the capturing means;
wherein the measuring means comprises:
a first measuring means directed generally to a position in front of the capturing means, for providing a measurement of the distance from the object to the first measuring means;
a connecting linkage for changing the angle of tilt of the first measuring means according to the vertical position of the capturing means; and
means for using the-distance of the object to the first measuring means and the angle of tilt to determine the scale of the image relative to the object itself.

14. A system for capturing an image of an object and for determining the scale of the image relative to the object itself, comprising:
a camera mounted to a vertically movable frame, for capturing the image;
a sonar system mounted in close proximity to the camera, for providing a sonar beam and subsequently a measurement of the distance from the object to the sonar system and for providing an angle of tilt of the sonar beam;
an alignment device, for vertically aligning the object with the camera; and
means for using the distance of the object to the sonar system and the angle of tilt to determine the scale of the image relative to
wherein the alignment device comprises one or more optical indicators aligned horizontally in relation to the camera.

15. A system for capturing an image of an object and for determining the scale of the image relative to the object itself, comprising:
a camera mounted to a vertically movable frame, for capturing the image;
a sonar system mounted in close proximity to the camera, for providing a sonar beam and subsequently a measurement of the distance from the object to the sonar system and for providing an angle of tilt of the sonar beam;
an alignment device, for vertically aligning the object with the camera; and
means for using the distance of the object to the sonar system and the angle of tilt to determine the scale of the image relative to the object itself;
wherein the alignment device comprises a funnel lens positioned in front of an illuminated crosshairs.

16. A method for capturing an image of an object and for determining the scale of the image relative to the object itself, the method comprising:
positioning the object in front of a camera;
positioning the camera or the object until the camera is aligned with a desired feature on the object;
maintaining the angle of a sonar device in relation to the object based on the position of the camera;
operating the sonar device to determine the distance of the object to the sonar device and using the distance of the object to the sonar device and the angle of the sonar device to determine the scale of the image relative to the object itself; and
operating the camera to create the image.

* * * * *

UNITED STATES PATENT AND TRADEMARK OFFICE
CERTIFICATE OF CORRECTION

PATENT NO. : 6,922,494 B1
DATED : July 26, 2005
INVENTOR(S) : P. Fay

It is certified that error appears in the above-identified patent and that said Letters Patent is hereby corrected as shown below:

Column 2,
Line 48, after "FIG. 5" please insert -- (i.e. FIGS. 5A and 5B in combination) --.

Column 3,
Line 6, please delete "t6" and substitute -- to -- therefor.

Column 4,
Line 5, please delete "handled" and substitute -- handheld -- therefor.
Line 21, please delete "FIG. 5," and substitute -- FIG. 5 (i.e. to FIGS. 5A and 5B in combination), -- therefor.

Column 6,
Line 31, please delete "sonar-device" and substitute -- sonar device -- therefor.
Line 52, please delete "sonar-system" and substitute -- sonar system -- therefor.

Column 7,
Line 47, please delete "the-distance" and substitute -- the distance -- therefor.

Column 8,
Line 12, after "to" please insert -- the object itself; --.

Signed and Sealed this

Sixth Day of December, 2005

JON W. DUDAS
*Director of the United States Patent and Trademark Office*